United States Patent [19]
Hopf

[11] Patent Number: 5,771,597
[45] Date of Patent: Jun. 30, 1998

[54] DEVICE FOR CONNECTING THE ARMS OF AN ANGLE

[75] Inventor: Leonhard Hopf, Westendorf, Germany

[73] Assignee: Klaus Bau-Technik, Germany

[21] Appl. No.: 637,775

[22] PCT Filed: Oct. 27, 1994

[86] PCT No.: PCT/EP94/03537

§ 371 Date: Jul. 29, 1996

§ 102(e) Date: Jul. 29, 1996

[87] PCT Pub. No.: WO95/12728

PCT Pub. Date: May 11, 1995

[30]  Foreign Application Priority Data

Nov. 5, 1993 [DE] Germany ............ 43 37 885.4

[51] Int. Cl.[6] .................... B43L 7/027; B43L 7/10
[52] U.S. Cl. .................. 33/474; 33/403; 33/465; 33/478
[58] Field of Search ............ 33/474, 403, 418, 33/420, 421, 424, 427, 429, 430, 437, 443, 452, 464, 465, 471, 475, 476, 478, 479, 480, 482, 484, 194, 534, 535, 538, 562

[56]  References Cited

U.S. PATENT DOCUMENTS

| 1,770,304 | 7/1930 | Ferris ............ 33/421 |
| 4,882,846 | 11/1989 | Reed ............ 33/427 |
| 5,351,407 | 10/1994 | Van Drielen ............ 33/474 |
| 5,524,353 | 6/1996 | Fink ............ 33/451 |

*Primary Examiner*—Christopher W. Fulton
*Attorney, Agent, or Firm*—Kane, Dalsimer, Sullivan, Kurucz, Levy, Eisele and Richard, LLP

[57]  ABSTRACT

A device for connecting the arms 4 of an angle, in particular a construction angle, comprises a corner piece 1 with two rails 5 which are at right angle to each other and to which the arms 4 which are formed by straight battens are connected by clamping bands 6.

17 Claims, 5 Drawing Sheets

DEVICE FOR CONNECTING THE ARMS OF AN ANGLE

FIELD OF THE INVENTION

The invention relates to a device for connecting the arms of an angle, such as a construction angle.

DESCRIPTION OF THE PRIOR ART

Handymen and workers in the construction industry, and in other fields, often need to measure or set angles over longer distances or components, such as when building or setting walls or partition walls at a certain angle, usually a right angle, to each other, or when drawing lines at right angles to each other. Conventional construction angles have the disadvantage that their arms are relatively short. If longer lines have to be drawn, normally battens are placed on the arms to lengthen them. As a result, however, errors of alignment are practically unavoidable. Longer arms make the construction angle exceptionally unwieldy, especially for transport and storage.

In order to avoid this disadvantage, it is known (DE-GM 92 03 881) to connect the two arms of the angle detachably to an intermediate piece (corner piece), whereby clamping devices in the form of conventional detachable furniture connectors are provided between the end faces of the arms and the intermediate piece. Through this construction it is possible to use long arms, as the angle can be disassembled for transport and storage and reassembled at the place of use. However, disadvantages have been (1) the low stability of the assembled angle and the measuring errors caused thereby, especially with longer arms, and (2) the fact that at the end faces of the arms and the corresponding faces of the intermediate piece, cooperating clamping devices must be provided requiring the use of expensive prefabricated arms. Further, the furniture connectors used as clamping devices are exposed to considerable wear as a result of frequent slackening and tightening, whereby dimensional stability is impaired.

SUMMARY OF INVENTION

It is the task of the invention to provide a device of the species set forth where, by use of simple battens of wood, light metal or another material, an exceptionally stable angle can be manufactured. In this way long distances, components or lines can be arranged against each other or drawn towards each other reliably at a predetermined angle, preferably a right angle.

In the device according to the invention the arms are set in rails of the corner piece over a long distance, so that the assembled angle is exceptionally stable. Since simple battens can be used as angle arms, an angle with any desired arm length can be assembled in an exceptionally inexpensive way.

The detachable connection of each arm to the rails is preferably provided by two spaced retaining means on each rail to ensure that the arms butt against the rails, and therewith form the desired angle, preferably a right angle, with each other.

The retaining means are preferably clamping bands, for example in the form of conventional pipe clamps, which enclose the arms so that the arms can easily be connected to and released from the rails.

The rails can consist of flat material. However, they preferably have an L- or U-shaped cross-section which opens outwardly, forming a lateral guide for receiving the arms. Additionally, it is especially advantageous if the rails are open at both ends, so that one of the battens which forms an arm of the angle can be fixed, projecting over the corner piece to form a T-shaped structure whereby (1) a right angle to the base formed by this batten can be more precisely determined and (2) an outer angle can be checked.

In order to stabilize the rails in their position in relation to each other, the rails can be braced, e.g. (1) by a strut which runs diagonally to the rails, forming the hypotenuse in the case of a right angle, and is connected to the rails, or (2) by a plate which connects the rails. The strut or plate can be provided with a graduation in degrees to define any angle between the arms by means of a cord fixed in the corner of the corner piece.

Preferably the corner piece, together with the rails and the strutting, is formed from a single-part component. This component can be manufactured very inexpensively as a plastic or light metal injection-molded part so that it can be afforded by handymen.

In order to reduce the space requirement of the device during transport and storage the corner piece can be divided at its corner, in which case the two parts are connected together in a hinged manner. The corner piece can thus be folded up with the rails like a compass. The device, so constructed, can also be used as a protractor or for drawing long lines which are at an angle other than a right angle to each other. If a strut is provided between the arms, it must either be detachable from one rail or be composed of two parts which are connected together in a hinged manner so that it is possible to fold up the device.

BRIEF DESCRIPTION OF THE DRAWINGS

Some exemplified embodiments of the invention are described in detail hereafter by reference to the drawings.

DETAILED DESCRIPTION OF THE PREFERRED EMBODIMENTS

Figure 1:
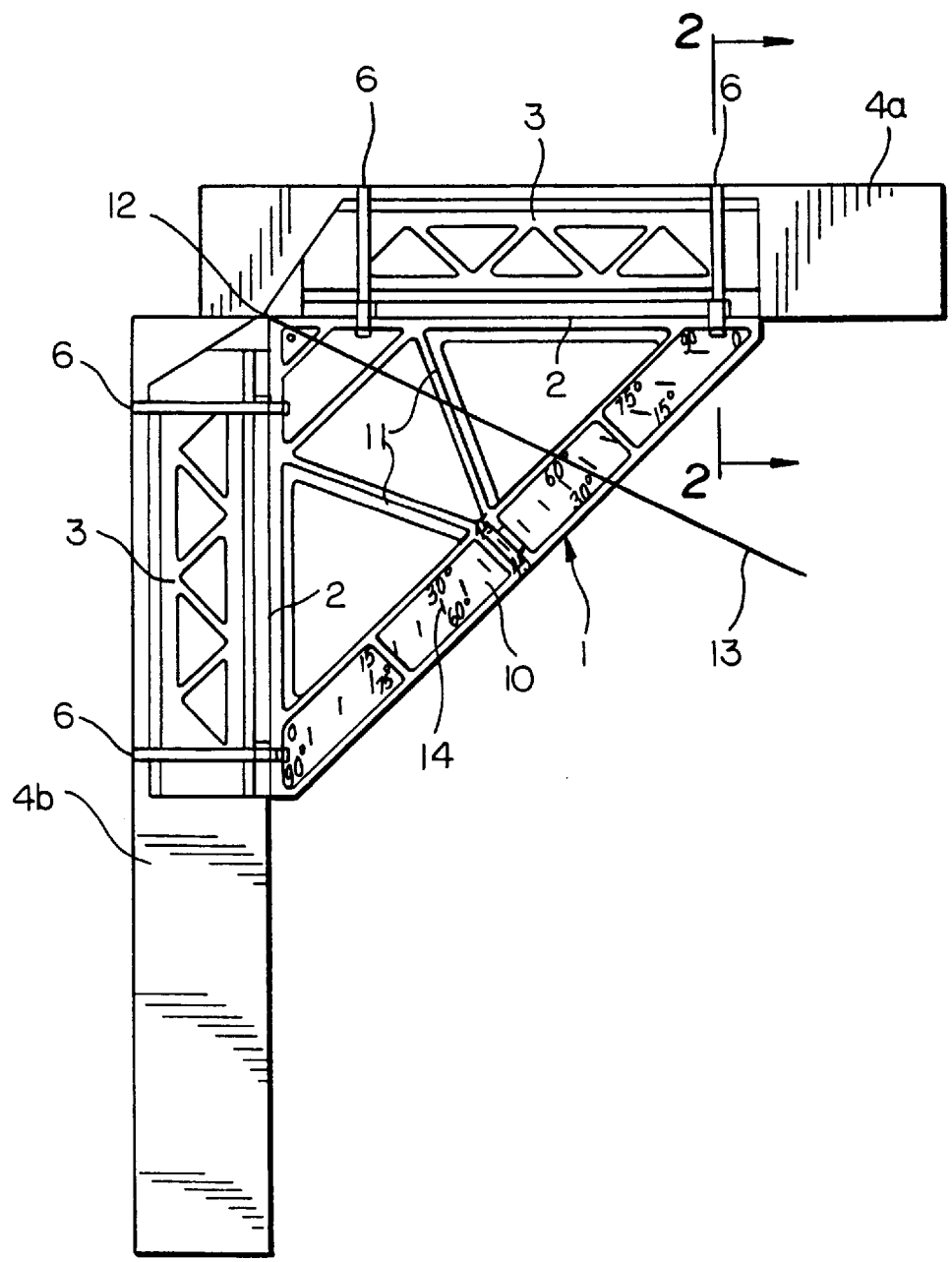
FIG. 1 shows a first example in top plane view.
Figure 2:
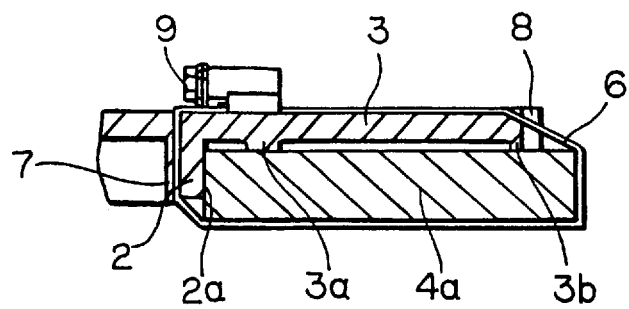
FIG. 2 shows a cross-sectional view along line 2—2 of FIG. 1.

The device illustrated in FIGS. 1 and 2 is composed of a corner piece with two arms 2, which in this example are at right angles to each other. Against one longitudinal edge of each arm 2 there is formed, as evident from FIG. 2, a wall 3 standing perpendicular thereto, forming a rail 5 with an L-shaped cross-section which serves to accept a batten 4a or 4b constituting one arm of the angle being formed. The inner faces 2a of the arms 2, and 3a and 3b of the walls 3 form abutment surfaces for the battens 4 which may consist of optional material. For example, the battens may be wood or light metal, and can be of any length. The inner surface 3 is provided with longitudinal ribs 3a and 3b in order to provide support for the battens 4. The battens 4 are each retained on their rails 5 by two spaced clamping bands 6 which extend around the battens and are led through openings 7 and 8 in the arms 2 and in the walls 3 and clamped by means of a screw 9. The battens 4 are thereby placed firmly against the inner faces 2a and 3a so that the angle between the battens is set exactly by the angle between the arms 2 or their inner faces 2a of the corner piece. In this example the angle is 90° but could also have another value. The clamping bands can be commercially available pipe clamps which can be easily replaced in the event of wear.

In order to reinforce the arms 2 the corner piece is provided with a strut 10 which runs diagonally between the arms and which, for its part, is reinforced by molded-on stays 11. Thereby, the device which is preferably manufactured in one piece from plastic or light metal, obtains exceptionally great rigidity. The arms 2, walls 3, struts 10 and stays 11 can be provided with ribs for reinforcement and with cavities in order to reduce weight.

In order to be able to mark any desired angle between the arms, there is provided in the corner of the corner piece 1, a hole 12 for fixing a cord 13, and the strut 10 is provided with a graduation in degrees 14.

Owing to the long rails of the rigid corner piece 1 guiding the battens, the assembled angle has a great stability. Owing to the fact that simple battens can be used as measuring arms or angle arms, the user only has to obtain the device illustrated in order to assemble an angle according to his requirements.

Figure 3:
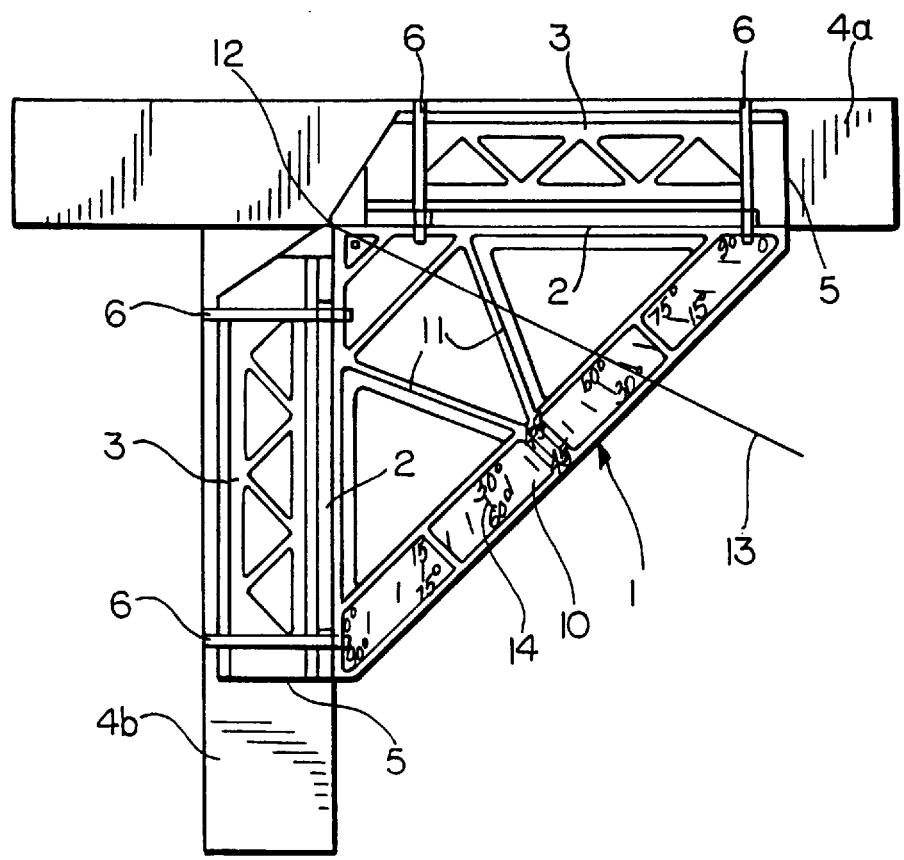
FIG. 3 shows a top plane view according to FIG. 1, in which one of the battens forming an arm of the angle is pushed through the device to form a T with the other batten.

The rails 5 are open at both ends so that one batten 4a can be pushed through the corner piece as illustrated in FIG. 3, while the other batten 4b butts obtusely against batten 4a. Thereby, a T-shaped structure is formed with a long base formed by batten 4a from which the other batten 4b projects at a right angle. In this embodiment, measuring or marking of an outer angle is also possible.

Figure 4:
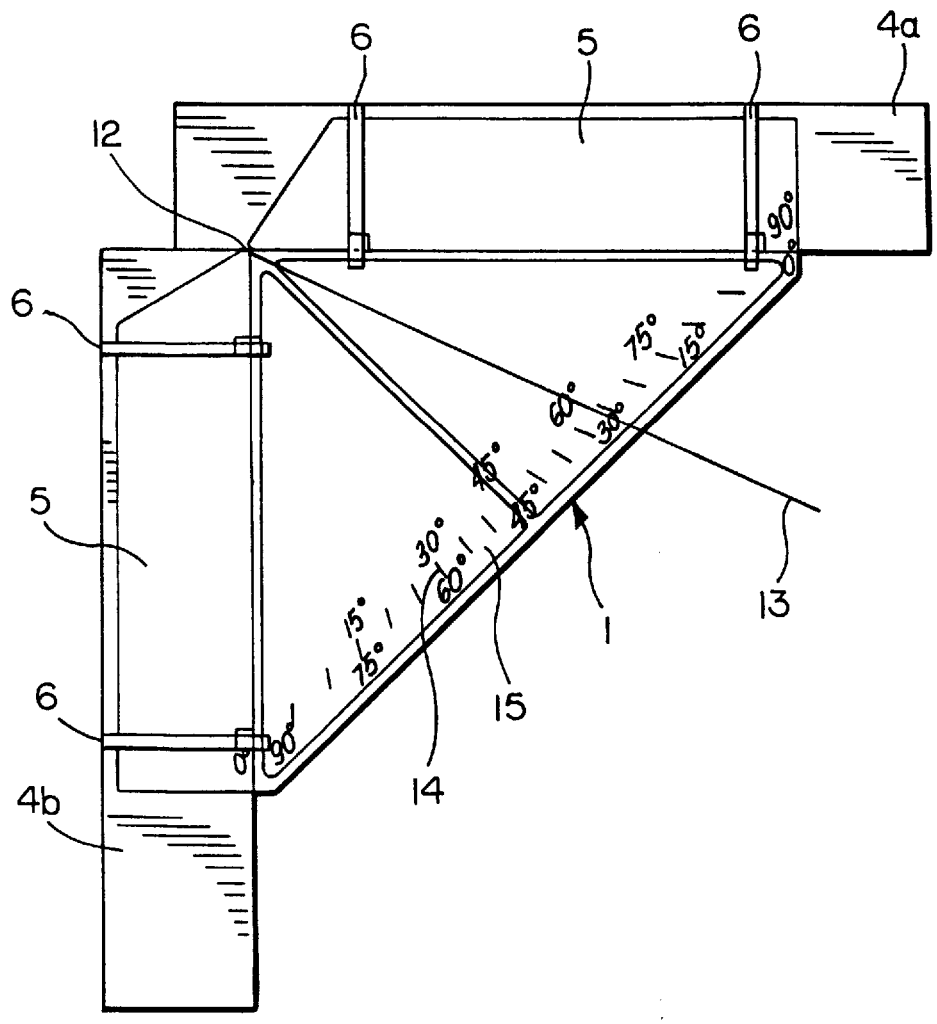
FIG. 4 shows a top plane view of a modification in the design of FIG. 1.

The example of FIG. 4 differs in principle from FIGS. 1 to 5 only in that the strutting of the rails 5 is produced by a plate 15. Once again this device can be in one piece or can consist of interconnected sheet metal pressings. As in the first example, a hole 12 is provided in the corner for fastening a cord 13, and the plate 15 is provided with a graduation in degrees 14.

Figure 5:
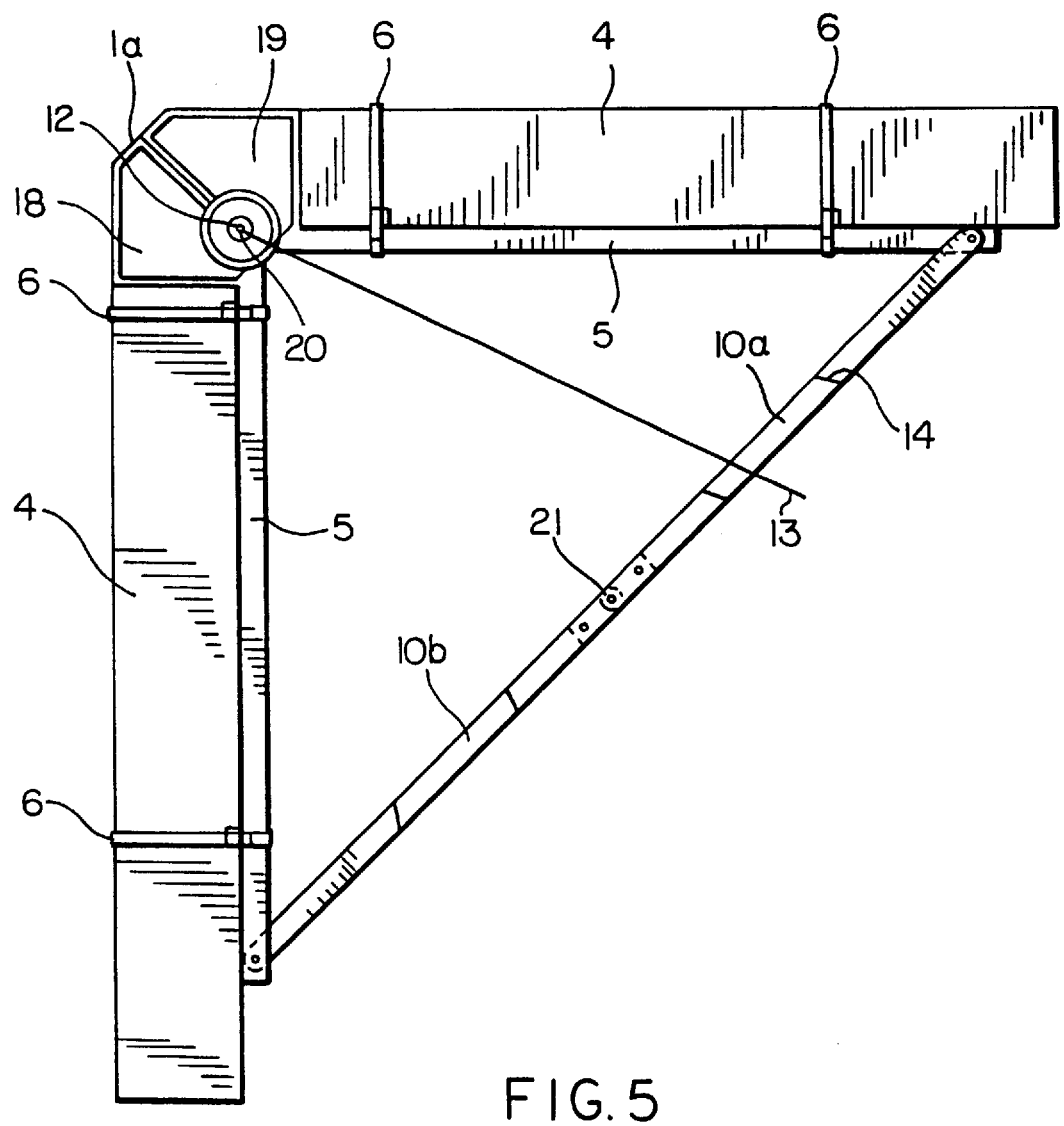
FIG. 5 shows a second example in top plane view in which the corner piece is composed of two parts connected together in a hinged manner.
Figure 6:
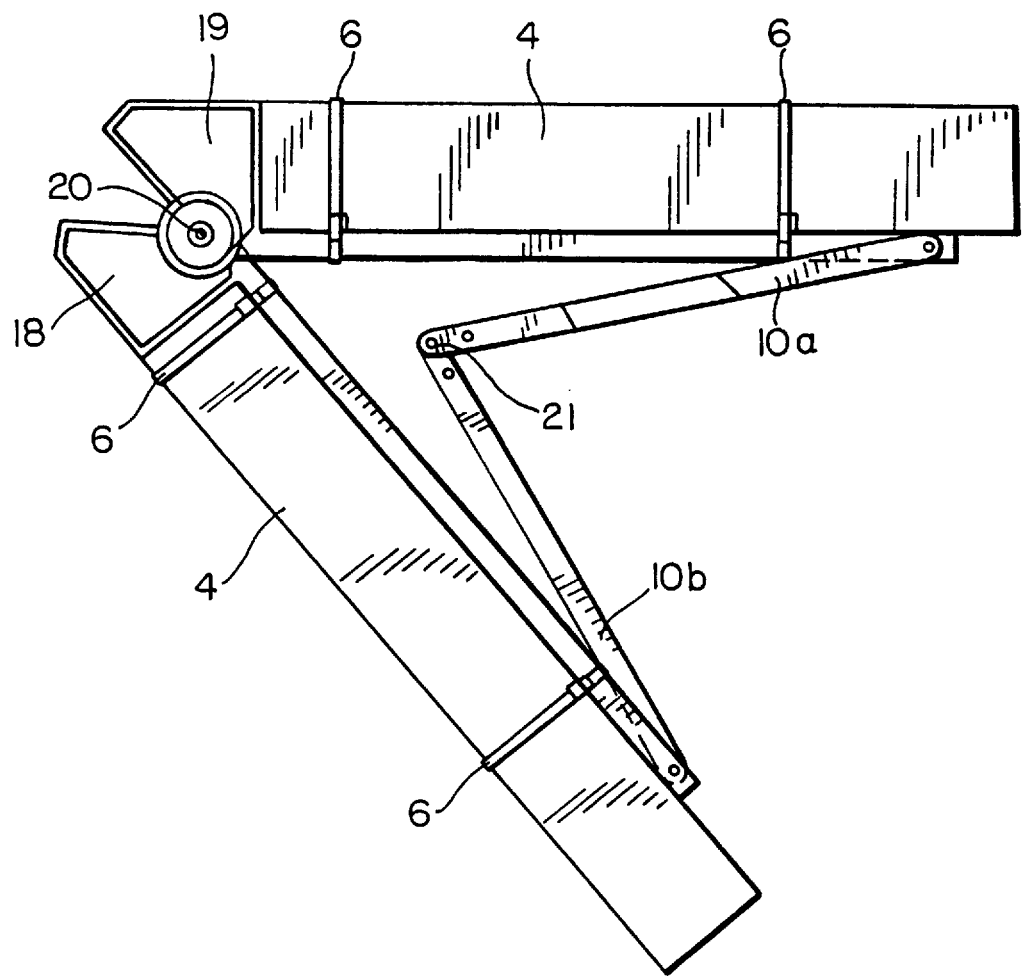
FIG. 6 shows a top plane view of the design of FIG. 5 in a partially folded state.

Reference is now made to FIG. 5 which shows a design differing from the preceding ones in that the corner piece 1a is composed of two halves 18 and 19, which are interconnected at the corner by a hinge 20, and each has a rail 5 for acceptance of a batten 4. The rails form a right angle with each other when they are in the position shown in FIG. 5. The connection of the device to the battens 4 is once again produced by the clamping bands 6. The device can be folded up by means of the hinge 20, as shown in FIG. 6, so that (1) the space requirement for storage and transport of the device is reduced to a minimum, and (2) measuring or marking angles varying from 90° is possible. If a strut connecting the two rails is provided, it must naturally either be detachable from one rail, or, as shown, be composed of two parts 10a and 10b swivellably connected to the rails and connected together in an articulated manner by a hinge 21, so that the device can fold up. The parts 10a and 10b can once again be provided with a graduation in degrees 14 to define any desired angle between the arms by means of a cord 13 which, for example, is fixed to the axis of the hinge 20.

I claim:

1. A device for connecting the arms (4) of an angle, comprising a corner piece (1) having receptacles which are at an angle to each other, for the detachable fixing of arms, characterized in that the receptacles are formed from two rails (5) which form an angle with each other and which have abutment surfaces (2a, 3a) for the arms (4), and that retaining means (6) for the detachable connection of arms (4) on the rails (5) are provided on the rails (5), said retaining means (6) being formed by clamping bands.

2. Device according to claim 1, characterized in that two retaining means (6) are arranged in a spacing from each other on each rail (5) for one arm (4a;4b).

3. Device according to claim 1, characterized in that the rails (5) have an L-shaped cross section which is open outwardly.

4. Device according to claim 1, characterized in that the rails (5) are provided with openings (7) through which the clamping bands (6) pass.

5. Device according to claim 1, characterized in that the rails (5) have a U-shaped cross section which is open outwardly.

6. Device according to claim 5 or 3, characterized in that the rails (5) are open at both ends.

7. Device according to claim 1, characterized in that the rails (5) are braced to each other.

8. Device according to claim 7, characterized in that the bracing is formed by a strut (10) which runs diagonally to the rails (5) and is connected to them.

9. Device according to any of claim 8, characterized in that means (12) for fixing a cord (13) are provided in the corner of the corner piece (1), and that the diagonal strut (10) or the plate (15) is provided with a graduation in degrees.

10. Device according to claim 7, characterized in that the bracing is formed by a plate (15) interconnecting the rails (5).

11. Device according to any of claim 7, characterized in that the bracing (10;15), the corner piece (1) and the rails (5) are a one-piece component.

12. Device according to claim 11, characterized in that the component is a plastic part.

13. Device according to claim 11, characterized in that the component is a light metal injection-molded part.

14. Device according to claim 1, characterized in that the corner piece (1a) is divided in its corner and that the two parts (18,19) are connected together in a hinged a manner.

15. Device according to claim 14, characterized in that bracing is formed by a strut which is arranged between the rails (5), and is composed of two parts (10a and 10b) which are connected together in a hinged manner in the center.

16. Device according to claim 1, wherein the arms are constructed from battens of wood.

17. Device according to claim 1, wherein the arms are constructed from battens of light metal.

* * * * *